3,265,566
INSECT REPELLING COMPOSITIONS
AND METHODS
Lyle D. Goodhue, Bartlesville, Okla., assignor to Phillips Petroleum Company, a corporation of Delaware
No Drawing. Filed July 16, 1965, Ser. No. 472,661
16 Claims. (Cl. 167—33)

This invention relates to a method and composition for combatting insects. In one aspect, this invention relates to a method and apparatus for repelling flies and other insects.

It has been found that a particular class of heterocyclic compounds, hereinafter referred to as N-nitroso-substituted piperidines, are not only very effective insect repellents but are extremely useful as fly repellents and particularly as space repellents for flies. Space repellents, as opposed to repellents which are utilized to coat a specific area, are those which can be sprayed in a vaporized form into a volume and which thereafter repel insects from substantially any part of that volume.

Accordingly, it is an object of this invention to provide a new and improved method and composition for combatting insects. Another object is to provide a new and improved method and composition for repelling flies. Still another object is to provide a new and improved method and composition for space repelling flies and other insects.

According to this invention compounds of the formula

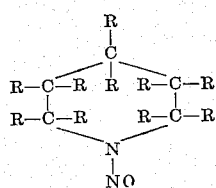

wherein each R is at least one radical selected from the group consisting of hydrogen and alkyl radicals having from 1 to 4 carbon atoms, inclusive, the total number of carbon atoms being in the range of from 5 to 45, preferably 5 to 15, are employed to repel flies and other insects and are preferably employed as a space repellent for house and stable flies. Compounds which are of particular interest within the scope of this invention are as follows:

N-nitrosopiperidine
N-nitroso-2-methyl-5-ethylpiperidine
N-nitroso-2,4-diethylpiperidine
N-nitroso-2,4,6-triisopropylpiperidine
N-nitroso-2-methyl-3,5-di-n-butylpiperidine
N-nitroso-2,2,3,3,4,4,5,5,6,6-decamethylpiperidine
N-nitroso-2,2,3,3,4,4,5,5,6,6-decabutylpiperidine The N-nitroso-substituted piperidines of this invention can be prepared by well known procedures such as reacting the desired piperidine with either (1) concentrated hydrochloric acid followed by reaction with sodium nitrate as shown in J.A.C.S., vol. 77, pp. 790–793, 1955, or (2) nitrous acid as shown in "Organic Chemistry" by Victor von Richter, vol. III, Heterocyclic Compounds, p. 183, 1923, published by P. Blakiston's Son & Co., Philadelphia, Pennsylvania.

The repellents of this invention can be applied in any conventional manner such as in solutions, emulsions, dust, aerosols, fogs, and the like as well as in the pure compound form. Solvents which can be employed include such materials as naphtha, kerosene, toluene, cyclohexanone, acetone, and the like. Particularly preferred solvents include the so-called deodorized species of the above-named and other solvents. Particularly preferred means for employing the compounds of this invention as space repellents include aerosols or other pressure type sprays. Carriers and diluents for space sprays include the Freons, light paraffin hydrocarbons such as propane, n-butane, isobutane, n-pentane, isopentane and the like and can be utilized in conventional manners known in the art. Solid inert carrier materials such as talc, kieselguhr and other inert carriers can be employed in preparing dusts. When the repellent of this invention is employed as an emulsion or dispersion, preferably aqueous, wetting or dispersing agents such as sorbitan monolaurate, alkylated aryl polyether alcohol, sorbitan monolaurate polyoxyethylene derivatives and others known in the art can be used.

It should be noted that the repellents of this invention can be employed with other insecticidal or insect repellent compositions and the like and can be employed as either a space or area repellent in combination with these other compositions.

The amount of repellent of this invention employed particularly in solution or emulsions can vary over a wide range, but will generally be within the range of from about 0.005 to about 20 weight percent based upon the total composition, solution or emulsion. It should be noted, however, that in certain specific instances it can be desirable to employ even lower and higher concentrations. When applying the repellent of this invention to an area or space the method of application should be chosen so that from about 1 to about 10 grams of the repellent of this invention per 100 square feet or from about 0.1 to about 25 grams of the repellent of this invention per 1000 cubic feet, respectively, is deployed.

EXAMPLE I

A series of tests was carried out in an olfactometer to test the compounds of this invention as repellents. The particular olfactometer employed in this test was a hemisphere cut out from a 24 inch world globe in which 24 holes were drilled. Behind each hole was mounted a fly trap which was positioned so that flies could enter the hole but were then trapped and could not leave. Each trap was painted with an acetone solution containing 1 weight percent of a candidate compound, based on the total solution weight. Thus, when the acetone evaporated a residue of the repellent of this invention was left on the trap. One of the traps was painted with acetone only to serve as a control. The hemisphere was then mounted on a turntable in a fly populated enclosure and rotated at one revolution per minute so that each hole would receive a substantially constant amount of light. The number of flies caught in each trap was then determined for each of four fifteen minute test periods. The results of these tests are expressed in Table I:

Table I

| Candidate Chemical | Number of Flies in Trap* | | | | |
|---|---|---|---|---|---|
| | Test 1 | Test 2 | Test 3 | Test 4 | Total |
| Acetone (control) | 47 | 46 | 23 | 40 | 156 |
| N-nitroso-2-methyl-5-ethylpiperidine | 26 | 15 | 28 | 15 | 84 |

*The numbers for the N-nitroso-2-methyl-5-ethylpiperidine are an average number calculated from the total number of flies trapped in all the traps painted with the piperidine solution for each test.

EXAMPLE II

A further test as to the true space repellency of the compounds of this invention was carried out using an olfactometer which consisted of two side-by-side, flared glass cylinders, the inside surfaces of which were sand blasted. One end of each of the cylinders was openly connected to an enclosure populated with flies and the opposite, flared end of each cylinder was openly connected to a source of air so that air could be blown through each cylinder into the enclosure. A wire screen of the same size as the inside diameter of each cylinder was placed 5 inches from the end of each cylinder that was connected with the enclosure. In each cylinder a piece of cardboard was placed below the screen which acted as a partition in separating the air flows from each cylinder. The end of each tube which was connected to the air source was covered with a piece of facial tissue treated with acetone or an acetone solution of N-nitroso-2-methyl-5-ethylpiperidine. One 1/100 of a milliliter of acetone was applied to one tissue while the other tissue was treated with the same volume of an acetone solution containing either 0.1, 1.0 or 10 weight percent of N-nitroso-2-methyl-5-ethylpiperidine. Each test was replicated four times. After the tissues had been treated with the substantially pure acetone and one of the above acetone solutions air was forced through the cylinders into the enclosure.

During the tests all of the flies in the enclosure moved to the side of the enclosure closest to that cylinder whose tissue was treated only with substantially pure acetone and remained there during a 2-minute observation. When the positions of the cylinders were reversed so that the cylinder whose tissue was treated only with substantially pure acetone was then in the position wherein the prior test the cylinder whose tissue was treated with the acetone solution containing the piperidine repellent had been placed, all of the flies immediately moved to the side of the enclosure closest to the newly located cylinder whose tissue had been treated with only substantially pure acetone.

These tests show that the piperidine compound employed had a 100 percent space repellency effect.

Reasonable variations and modifications are possible within the scope of this disclosure without departing from the spirit and scope thereof.

I claim:

1. A method for repelling an insect which comprises subjecting the insect to an effective repelling amount of at least one piperidine which has the formula

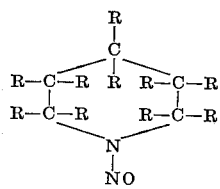

wherein each R is at least one material selected from the group consisting of hydrogen and alkyl having from 1 to 4 carbon atoms, inclusive.

2. A method for repelling an insect which comprises subjecting said insect to an effective repelling amount of N-nitrosopiperidine.

3. A method for repelling an insect which comprises subjecting said insect to an effective repelling amount of N-nitroso-2-methyl-5-ethylpiperidine.

4. A method for repelling an insect which comprises subjecting said insect to an effective repelling amount of N-nitroso-2,4-diethylpiperidine.

5. A method for repelling an insect which comprises subjecting said insect to an effective repelling amount of N-nitroso-2,4,6-triisopropylpiperidine.

6. A method for repelling an insect which comprises subjecting said insect to an effective repelling amount of N-nitroso-2-methyl-3,5-di-n-butylpiperidine.

7. A method for repelling an insect which comprises subjecting said insect to an effective repelling amount of N-nitroso-2,2,3,3,4,4,5,5,6,6-decamethylpiperidine.

8. A method for repelling flies from a surface which comprises applying to said surface in an amount of from about 1 to about 10 grams per 100 square feet at least one N-nitroso-substituted piperidine which has the formula

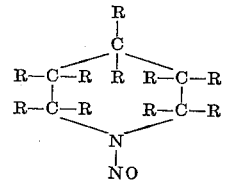

wherein each R is at least one material selected from the group consisting of hydrogen and alkyl having from 1 to 4 carbon atoms, inclusive.

9. A method for repelling flies from a volume which comprises dispersing in said volume in an amount of from about 0.1 to about 25 grams per 1000 cubic feet at least one N-nitroso-substituted piperidine which has the formula

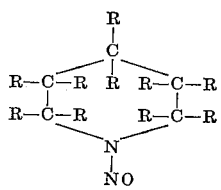

wherein each R is at least one material selected from the group consisting of hydrogen and alkyl having from 1 to 4 carbon atoms, inclusive.

10. An insect repelling composition comprising an effective repelling amount of at least one N-nitroso-substituted piperidine which has the formula

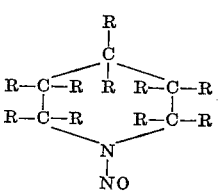

wherein each R is at least one material selected from the group consisting of hydrogen and alkyl having from 1 to 4 carbon atoms, inclusive carried by at least one solid inert carrier and at least one surface active agent.

11. An insect repelling composition comprising an effective repelling amount of N-nitrosopiperidine carried by at least one solid inert carrier and at least one surface active agent.

12. An insect repelling composition comprising an effective repelling amount of N-nitroso-2-methyl-5-ethylpiperidine carried by at least one solid inert carrier and at least one surface active agent.

13. An insect repelling composition comprising an effective repelling amount of N-nitroso-2,4,-diethylpiperidine carried by at least one solid inert carrier and at least one surface active agent.

14. An insect repelling composition comprising an effective repelling amount of N-nitroso-2,4,6-triisopropylpiperidine carried by at least one solid inert carrier and at least one surface active agent.

15. An insect repelling composition comprising an effective repelling amount of N-nitroso-2-methyl-3,5,di-n-butylpiperidine carried by at least one solid inert carrier and at least one surface active agent.

16. An insect repelling composition comprising an effective repelling amount of N-nitroso-2,2,3,3,4,4,5,5,6,6-decamethylpiperidine carried by at least one solid inert carrier and at least one surface active agent.

References Cited by the Examiner

UNITED STATES PATENTS

| | | | |
|---|---|---|---|
| 1,871,949 | 8/1932 | Bottrell | 167—13 |
| 1,957,429 | 5/1934 | Adams | 167—13 |
| 2,166,118 | 7/1939 | Bouquet | 167—13 |
| 2,197,624 | 4/1940 | Ter Horst | 167—13 |
| 2,226,298 | 12/1940 | Wellman | 260—293 |
| 2,274,476 | 2/1942 | Heckenbleckiner | 167—13 |
| 3,090,786 | 5/1963 | Levering | 260—293 |

OTHER REFERENCES

Bellamy: Chem. Abstracts 57 (1962).

JULIAN S. LEVITT, *Primary Examiner.*

STANLEY J. FRIEDMAN, *Assistant Examiner.*